US008757325B2

(12) United States Patent
Singer

(10) Patent No.: US 8,757,325 B2
(45) Date of Patent: Jun. 24, 2014

(54) APPLICATOR FOR DRIVE CHAIN LIQUID DISPENSING

(71) Applicant: Richard W. Singer, Menlo Park, CA (US)

(72) Inventor: Richard W. Singer, Menlo Park, CA (US)

(73) Assignee: Left Field Design, LLC, Menlo Park, CA (US)

( * ) Notice: Subject to any disclaimer, the term of this patent is extended or adjusted under 35 U.S.C. 154(b) by 0 days.

(21) Appl. No.: 14/012,815

(22) Filed: Aug. 28, 2013

(65) Prior Publication Data

US 2014/0060973 A1    Mar. 6, 2014

Related U.S. Application Data

(60) Provisional application No. 61/695,874, filed on Aug. 31, 2012.

(51) Int. Cl.
*F16N 7/16* (2006.01)
*F01M 9/06* (2006.01)

(52) U.S. Cl.
USPC ........................................ 184/15.1; 184/11.5

(58) Field of Classification Search
USPC ............... 184/11.5, 15.1, 15.2, 15.3; 222/484
See application file for complete search history.

(56) References Cited

U.S. PATENT DOCUMENTS

| | | | |
|---|---|---|---|
| 508,485 A | 11/1893 | Mowrer et al. | |
| 517,553 A | 4/1894 | Nelson | |
| 1,021,522 A | 3/1912 | Hinsdale | |
| 2,742,660 A | 4/1956 | Van Esley | |
| 2,813,599 A | 11/1957 | Amberg | |
| 2,820,234 A | 1/1958 | Rigney | |
| 2,951,557 A | 9/1960 | Jung | |
| 3,089,626 A * | 5/1963 | Kubiliunas | 222/484 |
| 3,148,401 A | 9/1964 | Gilchrist et al. | |
| 3,896,901 A | 7/1975 | Ango | |
| 3,934,677 A | 1/1976 | Schott et al. | |
| 4,008,968 A | 2/1977 | Hobbs | |
| 4,201,491 A | 5/1980 | Kohler | |
| 4,519,529 A * | 5/1985 | Seltz | 222/484 |
| 4,545,461 A | 10/1985 | Dewyer | |
| 4,578,120 A | 3/1986 | Chiarella | |
| 4,593,923 A | 6/1986 | Thalmann | |
| 4,783,186 A | 11/1988 | Manning et al. | |

(Continued)

FOREIGN PATENT DOCUMENTS

WO    86/05153 A1    9/1986

OTHER PUBLICATIONS

International Search Report and Written Opinion of the International Searching Authority mailed on Nov. 15, 2013, for International Application No. PCT/US2013/057435 filed on Aug. 30, 2013, 9 pages.

*Primary Examiner* — William E Dondero
*Assistant Examiner* — Robert T Reese
(74) *Attorney, Agent, or Firm* — Kilpatrick Townsend & Stockton LLP

(57) ABSTRACT

Liquid dispensing applicators adapted to be mounted to a container of lubricating oil or degreaser and used to lubricate or apply degreaser to a drive chain of a bicycle or motorcycle are disclosed. The applicator housing has an open slot to receive the chain. A wear-resistant and absorbent pad is positioned within the housing to engage the chain. A conduit between the absorbent pad and the container transmits liquid to the absorbent pad such that the chain can be cleaned or lubricated.

33 Claims, 22 Drawing Sheets

(56) References Cited

U.S. PATENT DOCUMENTS

| | | |
|---|---|---|
| 4,815,637 A | 3/1989 | Nellis |
| 4,961,662 A | 10/1990 | Chow et al. |
| 5,020,637 A * | 6/1991 | Hoenselaar et al. ......... 184/15.1 |
| 5,213,180 A | 5/1993 | Masonek et al. |
| 5,269,614 A | 12/1993 | Taylor |
| 5,443,139 A | 8/1995 | Scott |
| 5,484,038 A | 1/1996 | Rowell |
| 5,595,262 A | 1/1997 | Martin |
| 5,597,255 A | 1/1997 | Yager et al. |
| 5,647,456 A | 7/1997 | Gelb |
| 5,934,411 A | 8/1999 | Murano et al. |
| 6,257,369 B1 * | 7/2001 | Pesl ............................ 184/15.1 |
| 6,679,352 B2 | 1/2004 | Gillespie |
| 6,942,409 B2 | 9/2005 | Barbieri |
| 8,181,747 B2 | 5/2012 | Feldstein |
| 8,191,687 B2 | 6/2012 | Lary et al. |
| 8,225,907 B2 | 7/2012 | Soucy et al. |
| 2004/0182648 A1 | 9/2004 | Ludwig |
| 2005/0000752 A1 | 1/2005 | Fleige |
| 2009/0223745 A1 | 9/2009 | Marcucci |
| 2010/0101607 A1 | 4/2010 | Feldstein |
| 2010/0276229 A1 | 11/2010 | Winckler |
| 2010/0285912 A1 | 11/2010 | Aoki |
| 2011/0250999 A1 | 10/2011 | Nagele et al. |
| 2012/0132484 A1 | 5/2012 | Guillaume et al. |
| 2012/0180821 A1 | 7/2012 | Feldstein |
| 2012/0181303 A1 * | 7/2012 | Swanick ........................ 222/83 |

* cited by examiner

APPLICATOR FOR DRIVE CHAIN LIQUID DISPENSING

This application claims benefit under 35 U.S.C. §119(e) of U.S. Provisional Application No. 61/695,874 filed on Aug. 31, 2012, which is incorporated by reference in its entirety.

FIELD

The present disclosure relates generally to apparatus and methods for applying lubricant and/or cleaning solvent to a drive train such as a drive chain for a bicycle or a motorcycle.

BACKGROUND

Part of the regular maintenance of a bicycle or motorcycle includes periodically applying a lubricant to the drive chain. A common way of accomplishing this is to place a lubricant drip-container with its discharge opening above the chain, and then to move the chain along its normal path of travel while the lubricant is dispensed from the container directly onto the chain. One of the problems with this standard practice is that it is difficult to apply the lubricant uniformly to each chain link above the bushings, where the lubricant is needed. Another drawback is that a portion of the lubricant tends to pass through the chain and drop on the floor below, or onto parts of the bicycle, such as the rear wheel or tire. Yet another drawback with using lubricant drip-containers is the time it takes to lubricate each link in the chain. A second common way of lubricating a drive chain is to spray lubricant through a tube connected to an aerosol dispenser and applying the contents onto the chain while the chain is moved along its normal path of travel. This latter standard practice is easier and faster than drip-container application, but results in overspray of the lubricant onto the vehicle frame and wheels.

The majority of prior art drive chain lubricant applicators purport to both clean the chain and lubricate it. Some of these applicators use an oil reservoir that the chain is directed through, and the oil serves as both a cleaning solvent and a lubricant, resulting in the use and contamination of much more oil than is actually needed to lubricate the chain. Other cleaning/lubricant applicators use brushes without oil reservoirs, which may dislodge contaminants but may not remove them. High manufacturing cost is a major disadvantage of the majority of existing lubricant applicators claiming to both clean and lubricate the chain. These applicators include many intricate parts that must be assembled prior to use. The large number of parts and the concomitant assembly requirements substantially increase manufacturing costs.

Several examples of drive chain lubricant applicators disclosed in the art and problems associated with these drive chain lubricant applicators are provided as follows.

Thalmann (U.S. Pat. No. 4,593,923) discloses a reservoir that is attached to a bicycle such that as the sprocket chain advances, it passes through the reservoir, which contains a solvent as well as brushes to clean the chain. Chiarelli (U.S. Pat. No. 4,578,120) provides a sprocket chain cleaner in which the reservoir is provided with rotary brushes that are turned by the sprocket chain, wherein the reservoir contains either a solvent or a lubricant. Pesl (U.S. Pat. No. 6,257,369) describes an apparatus for cleaning and lubricating drive chains, in particular motorcycle drive chains, that includes brushes attached in a two-piece housing that must be assembled around the drive chain and secured to the motorcycle. The practical drawbacks to the Thalmann, Chiarelli, and Pesl schemes is that all require attachment to the motorcycle or bicycle, hence each time the applicator is put to use it must be bolted or otherwise secured to the vehicle and then later detached therefrom. These devices also have a large number of parts, which therefore increases their manufacturing costs. The Chiarelli scheme uses more lubricant than is actually needed to lubricate the chain, which emerges wet, thereby allowing dirty solvent and/or lubricant to drip on surfaces near the vehicle.

Barbieri (U.S. Pat. No. 6,942,409) describes a bicycle chain cleaner with several rotary brushes: one each in a two-piece, hinged housing that encloses the drive chain and attaches to an aerosol dispenser. Manning (U.S. Pat. No. 4,783,186) describes a sprocket chain cleaner that uses opposing brushes formed by strong, flexible bristles, such as nylon bristles, capable of forcefully scrubbing the advancing sprocket chain. Hoenselaar (U.S. Pat. No. 5,020,637) discloses a lubricant applicator that is an open ring fitted to an aerosol dispenser with three brushes, spaced apart from one another inside the ring at an angular distance of approximately one-third of a circle. Practical drawbacks to the Barbieri, Manning, and Hoenselaar schemes include multiple parts, brushes that must be cleaned periodically, and their practical use is limited to aerosol dispensed lubricants.

Masonek (U.S. Pat. No. 5,213,180) is a lubricant applicator for a drive chain having a housing with interior flexible plastic bristles. The Masonek apparatus must be secured around the sprocket chain and secured to the vehicle frame, requiring assembly and disassembly as well as periodic cleaning of the plastic bristles.

Other liquid applicators are disclosed in the following documents. Hinsdale (U.S. Pat. No. 1,021,522) is a dispensing applicator for free-flowing liquid comprising a container and a cup with a liquid-tight container seal opposite the cup, and a permanently-mounted sponge in the cup, that is in communication with the interior of the container. Rigney (U.S. Pat. No. 2,820,234) is a dishwashing tool having a flexible container with a valve-closure that includes an adhesive-mounted sponge that absorbs detergent as the container is compressed in the hand of the user. Gilchrist et al. (U.S. Pat. No. 3,148,401) and Kohler (U.S. Pat. No. 4,201,491) disclose a liquid applicator with an adhesive-mounted sponge that is particularly applicable to applying shoe polish. Practical drawback to the Hinsdale, Rigney and Gilchrist applicators, when used for applying cleaning solvent and lubricant to drive chains, are accelerated wear due to drive chain abrasion as the chain moves across the sponge, and sponges that cannot be replaced when worn or clogged. Yager et al. (U.S. Pat. No. 5,597,255), Chow et al. (U.S. Pat. No. 4,961,662), Hobbs (U.S. Pat. No. 4,008,968), and Van Esley (U.S. Pat. No. 2,742,660) disclose liquid applicators having replaceable sponges with laminated molded-plastic backing parts. The laminated backing adds to the manufacturing cost of the replaceable part because an additional part, and assembly of the two parts, is required.

The usual method of applying the lubricant is a direct manual operation of discharging the lubricant from the container directly onto the chain. There is a long-felt need for a low-cost chain lubricant applicator that facilitates the usual method for applying lubricant directly to the chain, but with application improvements that include ease-of-use, accuracy and speed, and that also prevents dripping, overspray, and the need for tool clean-up or disassembly.

SUMMARY

The lubricant applicators provided by the present disclosure can be adapted for use in conjunction with a lubricant dispensing container for applying the lubricant to a drive chain, such as a drive chain for a bicycle or motorcycle, also referred to herein as a roller chain. In certain embodiments, applicators include the combination of such applicators with the lubricant dispensing container. The terms fluid or liquid are also used herein to refer to a lubricant, degreaser, or other solvent intended to be applied to a drive chain.

The lubricant applicators comprise a peripheral housing defining an open lubrication area to receive and guide a drive chain. In certain embodiments, the housing is a single, injection-molded plastic part. A wear-resistant and absorbent pad, that holds lubricant and is configured to engage a drive chain, is mounted to the housing surface having perpendicular chain guide surfaces, and an opening in communication with the liquid contents of the dispensing container.

In an embodiment of this disclosure, the integral mounting member of the housing is a spout adapted to replace the flip-top spout that is integral to, yet a separate part of, a readily available flip-top container closure so as to mount the applicator to the container, and to prevent the free flow of liquid from the container when the applicator is rotated to shut the closure. A conduit through the housing provides a lubricant discharge path between the dispensing container and the absorbent pad. In this embodiment, the discharge hole is positioned in the middle of the absorbent pad, whereby the lubricant is discharged into the pad to then be applied to the drive chain which is being lubricated.

In another embodiment of this disclosure, the peripheral housing of the applicator and the container closure are integral features of the same part. This embodiment has a valve or a flexible control membrane with a compressible opening such as a slit over the open end of the container that controls the flow of fluid from the container.

In certain embodiments, the fluid transfer pad is held in place by undercuts in the peripheral sidewalls of the housing that also serve to guide the drive chain and by ribs on each open end that receives the drive chain.

The housing can be characterized by a lengthwise dimension parallel to the lengthwise axis of the chain when the drive chain is positioned in the lubricating area of the housing. The lengthwise dimension of the housing is sufficient so that the housing sidewalls can provide adequate chain guidance, without causing the chain to bind, while passing through the applicator, if the housing is twisted relative to the lengthwise axis of the chain. The length and width of the housing are sufficient to provide for an absorbent pad that is large enough to contain a variable amount of lubricant while tending to prevent dripping of lubricant from the pad. The width of the housing is sufficient to provide adequate clearance for a variety of drive chain widths.

In certain embodiments of the disclosure, the container to which the applicator is connected is a flexible plastic bottle with a modified flip spout dispenser closure. The applicator replaces the flip spout of the dispenser closure with its lubricant dispensing surface perpendicular to the axis of the bottle. In another embodiment, the applicator is integral to the container closure. In another embodiment the container to which the applicator is connected is a flexible plastic bottle with a modified push/pull valve dispenser closure. The applicator replaces the valve cap of the dispenser closure with its lubricant dispensing surface perpendicular to the axis of the bottle. In another embodiment the applicator is integral to the container closure. The applicator with an attached bottle are positioned to engage the top of the chain, and while the chain is moved through the applicator, the bottle is gently squeezed to disperse lubricant onto the absorbent pad, thereby lubricating the drive chain.

In another embodiment of this disclosure, the container to which the applicator is connected is an aerosol can. The applicator with a connected aerosol can is positioned to engage the chain, and while the chain is moved through the applicator, the nozzle is occasionally depressed to disperse lubricant onto the absorbent pad, thereby lubricating the drive chain.

In certain embodiments, the absorbent pad is made from spun polypropylene fiber having sufficient rigidity to remain firmly mounted to the housing yet permit easy replacement when worn or clogged. The pad can also be made from a relatively rigid open cell foam material.

Other features of the present disclosure will become apparent from the following detailed description.

DETAILED DESCRIPTION

Lubricant applicators provided by the present disclosure may be configured to be used with squeeze-type lubricant containers, spray-type lubricant containers, push/pull-type lubricant dispensers, or other lubricant containers.

Squeeze-type lubricant containers typically include a discharge spout having an opening through which lubricant flows when the body of the container is squeezed. The discharge spout is typically connected to the cap of the lubricant container by means of a pivot or a cylindrical member with an undercut on the inside diameter, both of which are press-fit onto the cap.

Certain embodiments of lubricant applicators provided by the present disclosure are configured to mechanically and fluidly connect to the discharge spout of a squeeze-type lubricant container. Such embodiments are shown, for example, in FIG. 2.

Certain embodiments of lubricant applicators provided by the present disclosure are configured to mechanically and fluidly connect to the cap of a squeeze-type container and to replace the discharge spout. Such embodiments are shown, for example, in FIGS. 5, 6, 7, 8, 10, 11, and 12.

Certain embodiments of lubricant applicators provided by the present disclosure are configured to mechanically and fluidly connect to the cap of a lubricant container with the discharge spout removed. Such embodiments are shown, for example, in FIGS. 1, 13, 14, 15, 16, and 17.

Figure 18:
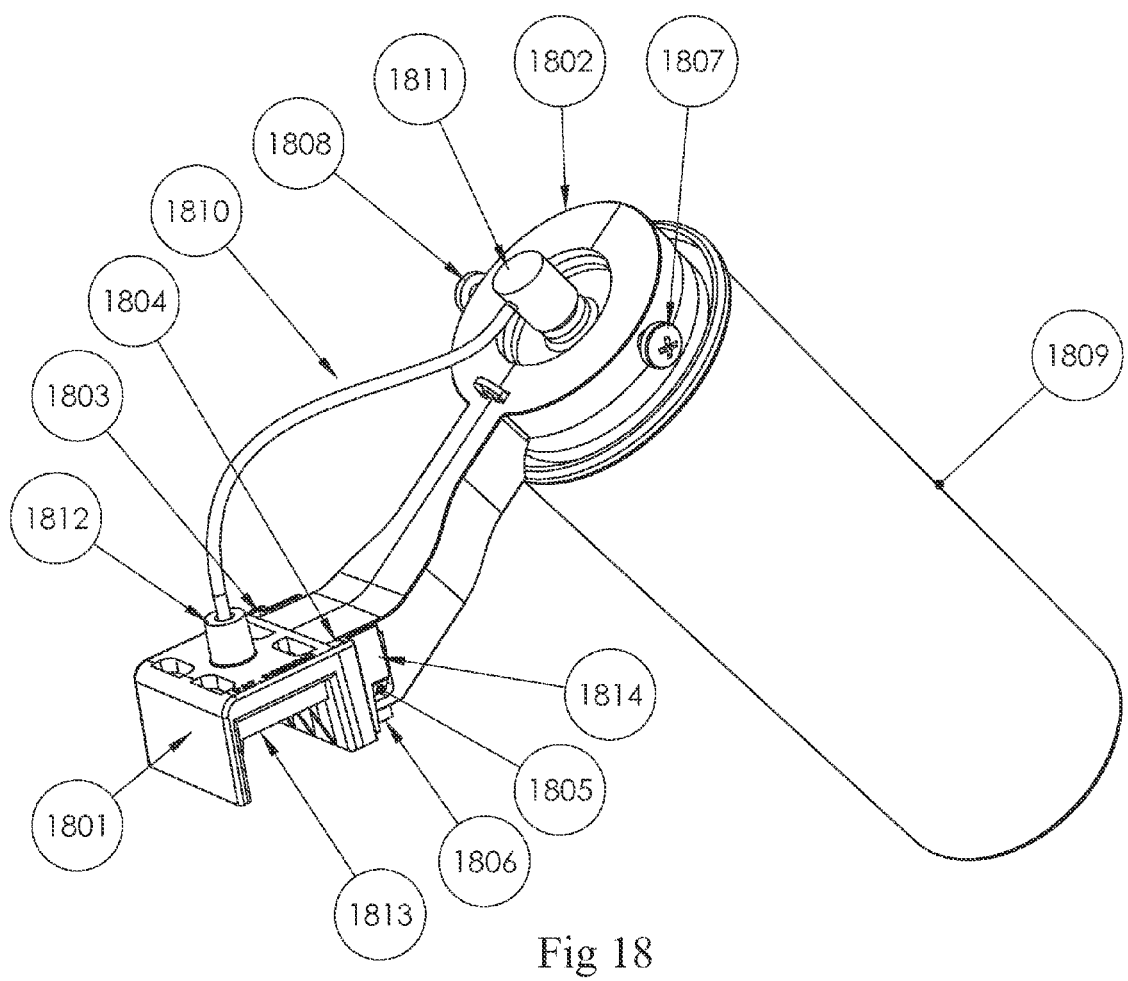
FIG. 18 shows a perspective view of a drive chain lubricant applicator and dispensing container, in accordance with certain spray can embodiments of the disclosure.

Examples of lubricant applicators provided by the present disclosure configured for use with spray-type lubricant containers are shown, for example, in FIG. 18. As shown in FIG. 18, a lubricant applicator provided by the present disclosure can be adapted to mechanically connect to the top of a spray container and to fluidly connect to the discharge spout of the spray container using a tube.

Examples of lubricant applicators provided by the present disclosure configured for use with push/pull-type lubricant dispenser are shown, for example, in FIGS. 19, 20, 21 and 22. In the push/pull-type lubricant dispenser embodiments, a lubricant applicator provided by the present disclosure is configured to mechanically and fluidly connect to the open end of a push/pull-type lubricant dispenser with the valve cap removed.

Figure 1:
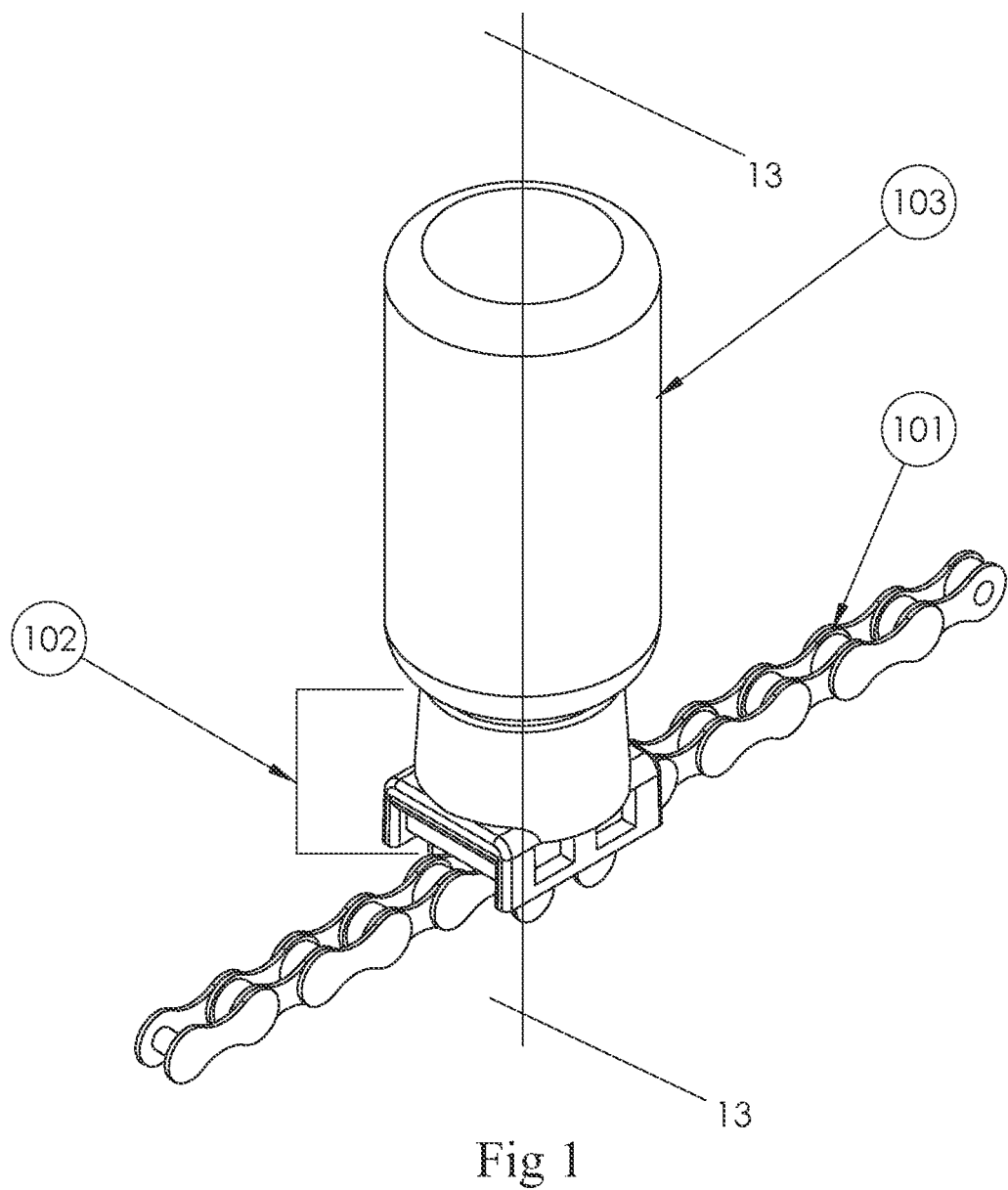
FIG. 1 shows a perspective view of a drive chain lubricant applicator and dispensing container, shown with a partial drive chain, in accordance with certain embodiments of the disclosure.
Figure 2:
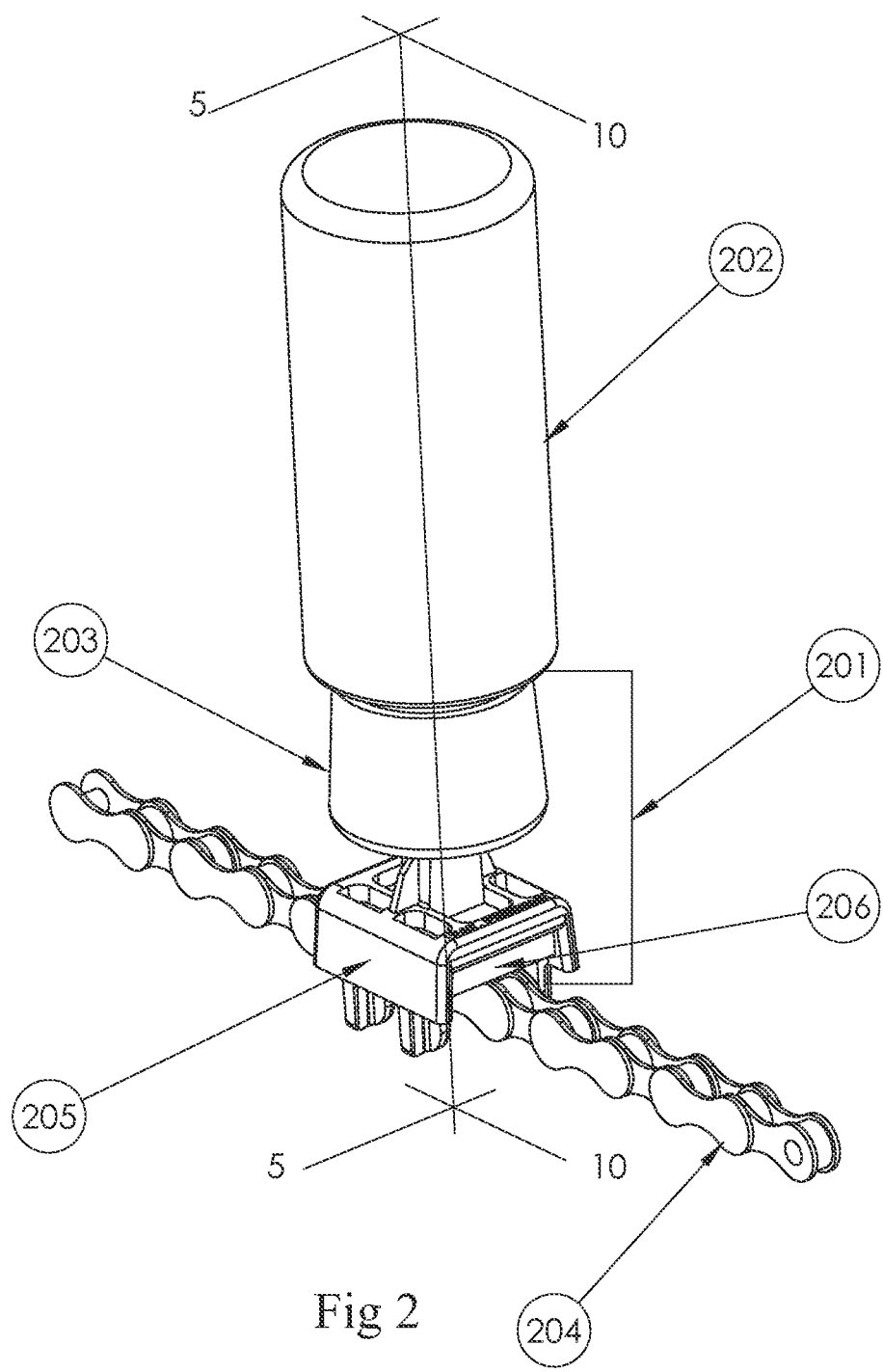
FIG. 2 shows a perspective view of a drive chain lubricant applicator and dispensing container, shown with a partial drive chain, in accordance with certain embodiments of the disclosure.
Figure 3:
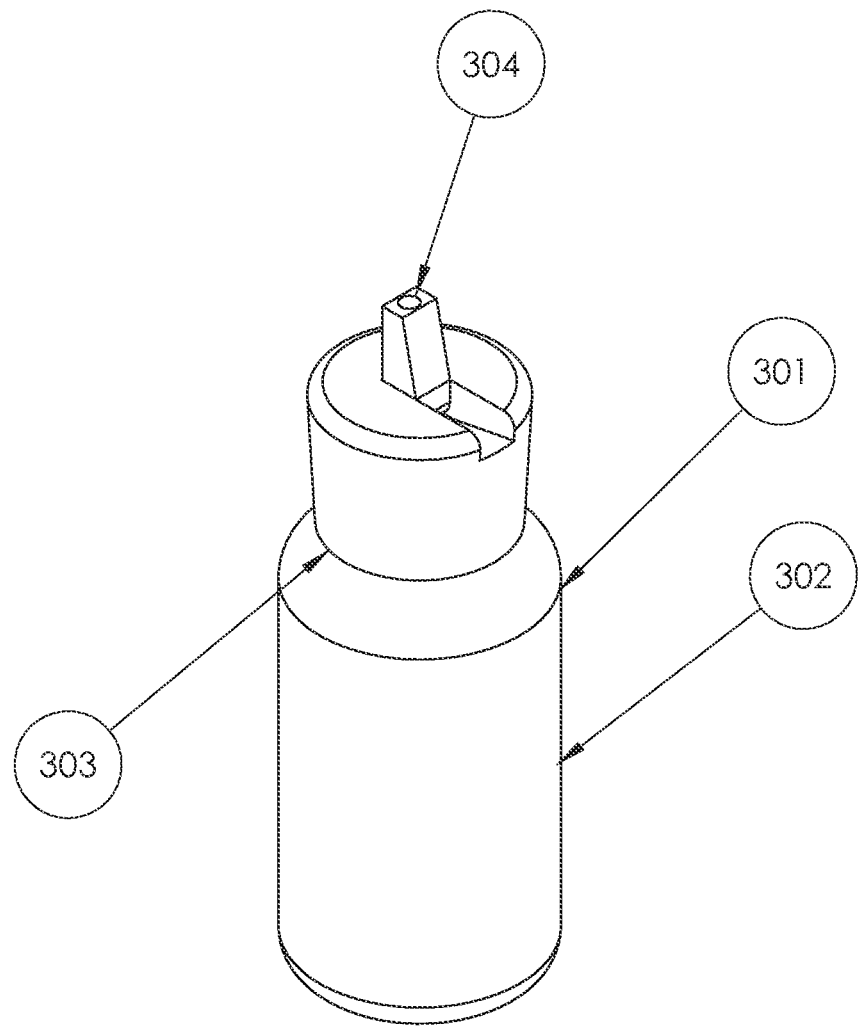
FIG. 3 and FIG. 4 show perspective views of a flexible, plastic dispensing container having a flip top closure, with and without the snap-together spout part, respectively, in accordance with certain embodiments of the disclosure.
Figure 4:
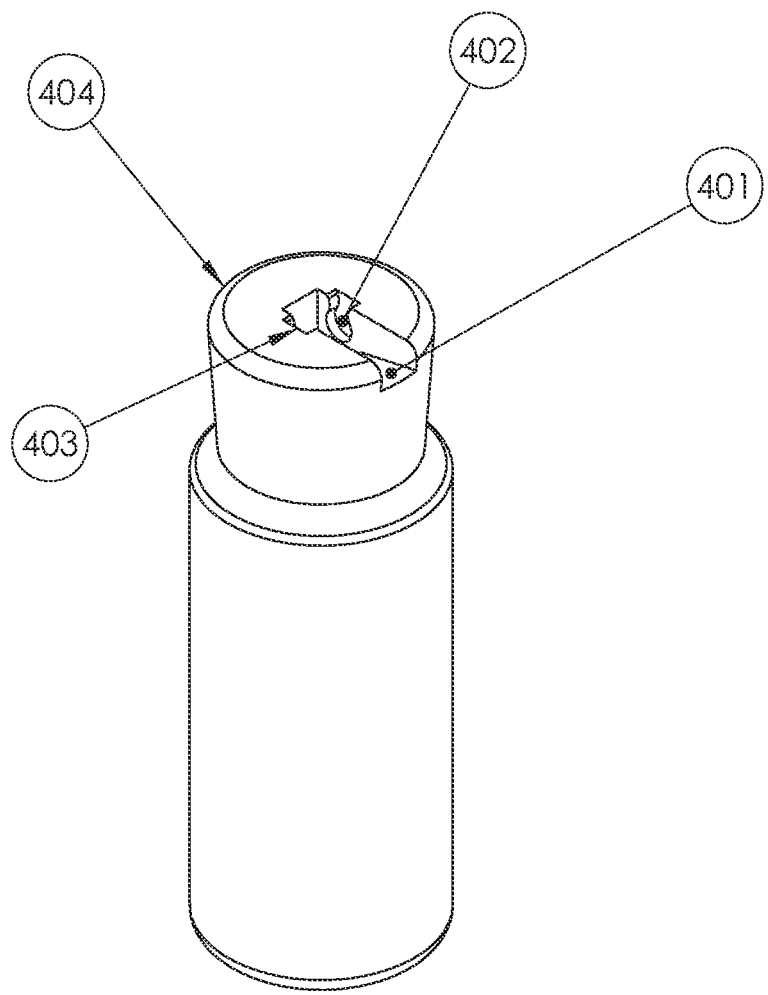

With reference to FIG. 1 and FIG. 2, applicators of the present disclosure are shown in an operating position relative to a standard bicycle or motorcycle drive chain 101 which is to be lubricated by the applicator. In the FIG. 1 embodiment, the applicator 102 is designed to be used conveniently and effectively in conjunction with a standard plastic bottle 103. In another embodiment shown in FIG. 2, the applicator 201 is used in conjunction with a standard plastic bottle 202 and a standard flip spout dispenser closure 203. Examples of flip-spout designs are shown in FIG. 3 and FIG. 4. This standard container 202 will be described briefly, after which the applicator will be described in more detail.

FIG. 3 shows a standard container 301 with a main cylindrical body portion 302, which contains lubricant or cleaning solvent, and an open end cap 303. Mounted to the open end cap 303 is a top cover with a discharge spout 304. As stated previously, the common method of utilizing such a standard container 301 to lubricate a drive chain is to discharge the lubricant directly from the discharge spout 304 onto the chain, while the container 301 is gently squeezed in an inverted position. Discharge spout 304 is typically attached to open end cap 303 using a snap-fit pivot. As shown in FIG. 3, discharge spout 304 is in an open configuration in which lubricant can escape from the opening in spout 304 when a pressure is applied to cylindrical body portion 302 such as when cylindrical body portion 302 is squeezed. The container 301 can be closed by pivoting discharge opening 304 into the recess in open end cap 303 and against the body of open end cap 303.

FIG. 4 shows a flip-spout container having a cap 404 with features for mounting the flip-spout including two slots 402 and 403 on each side of cavity 401.

Figure 5:
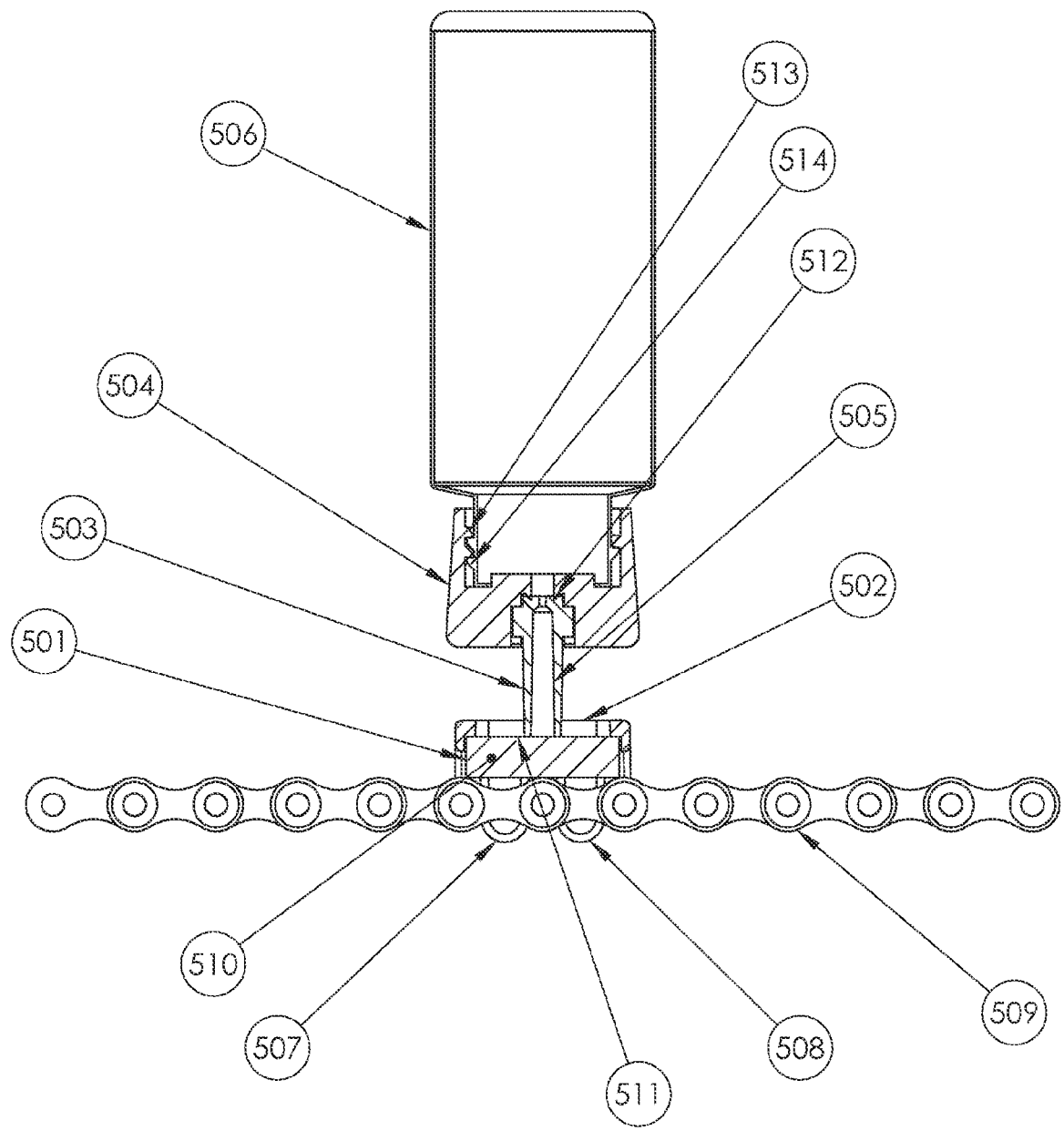
FIG. 5 shows a cross-sectional front view taken along section 5-5 of FIG. 2, showing a drive chain lubricant applicator and dispensing container, with a partial drive chain, in accordance with certain embodiments of the disclosure.
Figure 6:
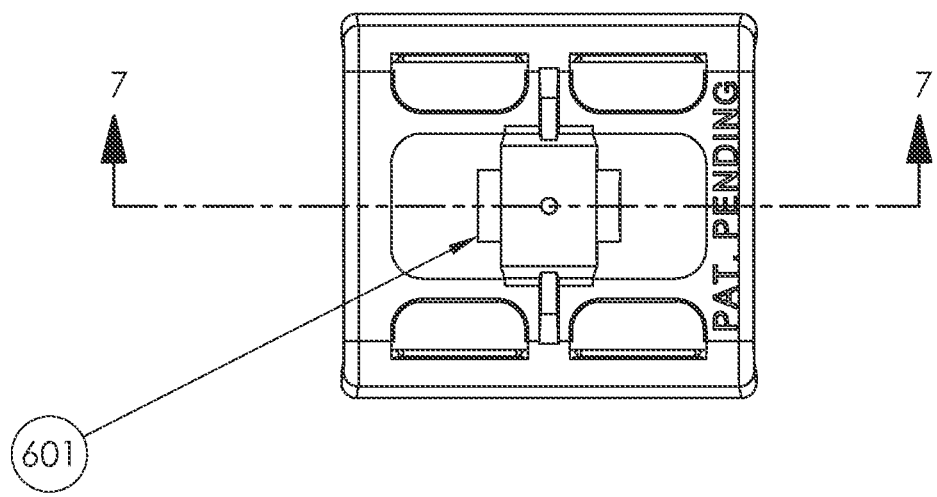
FIG. 6 shows a top view of a drive chain lubricant applicator, in accordance with certain embodiments of the disclosure.
Figure 7:
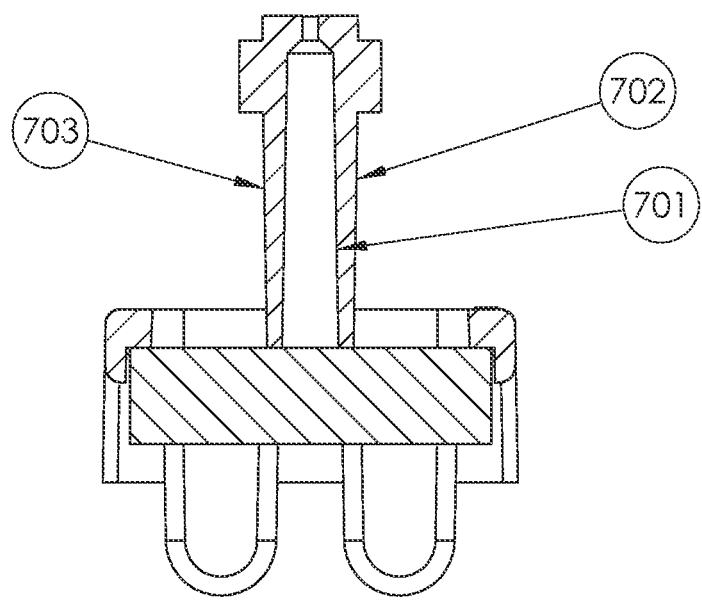
FIG. 7 shows a cross-sectional front view taken along section 7-7 of FIG. 6, showing a drive chain lubricant applicator, in accordance with certain embodiments of the disclosure.
Figure 8:
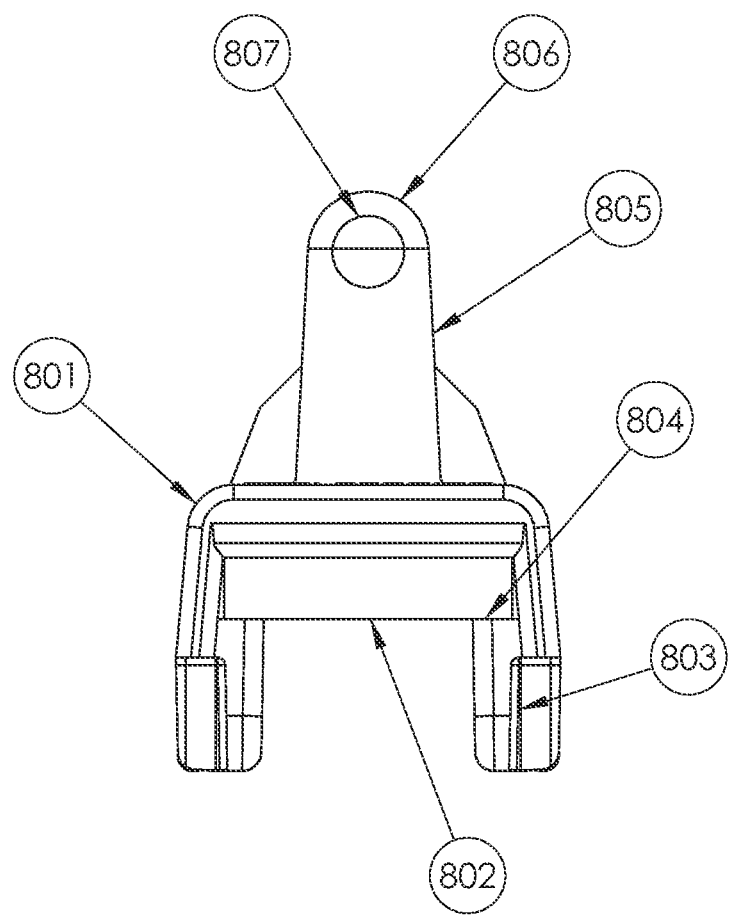
FIG. 8 shows a side view of a drive chain lubricant applicator, in accordance with certain embodiments of the disclosure.

FIG. 5 shows the embodiment shown in FIG. 2, including a lubricating pad 501 and a single part housing 502, that includes a spout and mounting portion 503 by which the applicator is mounted to the container closure 504, and that provides a discharge path 505 between the contents of container 506 and the lubricating pad 501, and having guides 507 and 508 on both sides (one side not shown) configured to guide the drive chain 509 to prevent the applicator from slipping off the chain 509 when the applicator is in use. The applicator can be considered as having a lengthwise axis that is parallel to the direction of drive chain travel, a transverse axis perpendicular to the lengthwise axis, and a vertical axis, which is parallel to the cylindrical axis of the container 506.

The lubricating portion 510 of the housing 502 comprises a surface 511 that the absorbent pad 501 is mounted to or retained within, and the conduit 505 that connects the pad mounting surface 511 to the mounting portion 503, by which the applicator is attached to the container closure 504, and is in communication with the liquid content of the container 506.

The container closure 504 can be configured to fasten to container 506 for example, with helical threads 513 and 514 on the respective parts.

Mounted to or retained by the housing 502 is a removable and wear-resistant pad 501 that absorbs liquid discharged from the conduit 505 as the container 506 is gently squeezed, to lubricate the drive chain 509 as it passes through the applicator with alignment maintained by guides 507 and 508.

Figure 9:
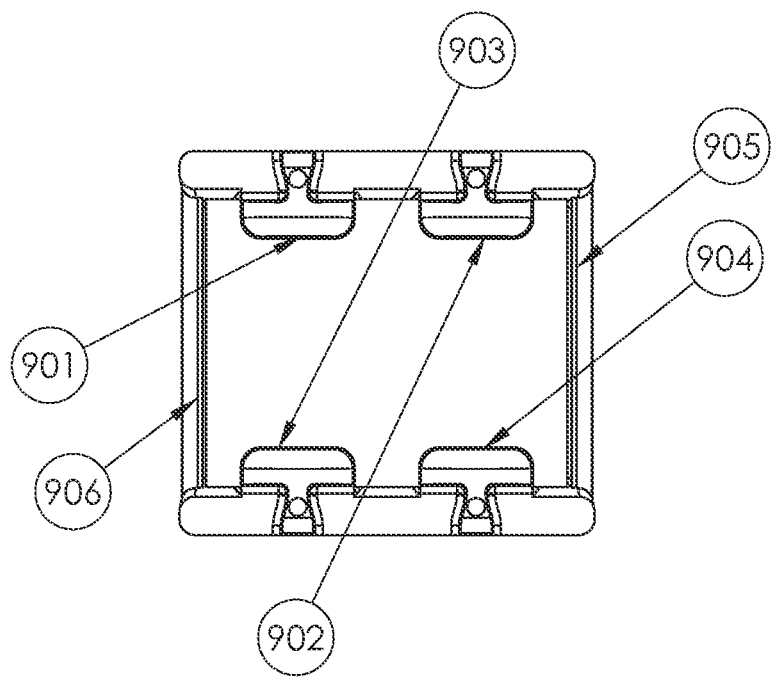
FIG. 9 shows a bottom view of a drive chain lubricant applicator, in accordance with certain embodiments of the disclosure.

Except where otherwise mentioned, FIG. 6 through FIG. 9 describe the FIG. 2 embodiment of the applicator, comprising the housing 801 and the absorbent pad 802 and the apparatus for mounting and sealing the embodiment with the container closure 404 (FIG. 4). As shown in FIG. 9, the housing 801 has two pairs of guide ribs 901/902, and 903/904, configured to be disposed on each side of the drive chain 204 (FIG. 2), and parallel to the lengthwise axis, and which align the housing 205 to the drive chain 204. In certain embodiments, each guide rib 803 has an undercut 804 configured to hold or retain the absorbent pad 802 in place, and a width dimension between the two pairs of guides, 901/902 and 903/904, that provides clearance for a range of drive chain widths. On each open end of the housing 801 are low ribs 905 and 906 that prevent the pad 802 from becoming dislodged as the drive chain 204 is moved through the housing 205. The pad 802 is easily and securely installed in the housing by placing the pad 802 diagonally between the pairs of guide ribs 901/902 and 903/904, inserting one edge of the pad into one of the paired, guide pin undercuts 804, then pressing the pad 802 against the bottom of the housing 801, so the opposite edge of the pad 802 engages the opposite paired guide pin undercuts 804.

In can be appreciated that although the chain guides are shown as ribs, other configurations and dimensions of guide may be used that serve to guide, direct, and/or maintain a chain in the center of applicator such that lubricant may be efficiently transferred from the fluid transfer pad to the drive chain. For example, where guide ribs are used, there may be one or more ribs on either side of the applicator such as for example, one, two, three or more guide ribs on either side of the applicator. The ribs may be integral to the applicator such that they are fabricated as the same part, or may be added to applicator during assembly. In certain embodiments, the guides may be adjustable to adapt to different widths of drive chain. For example, the guides may be configured to be slidably adjustable, adjustable using a screw mechanism, or adjustable using a thumbwheel mechanism.

In the FIG. 2 embodiment of the present disclosure, the mounting portion of the housing 205, by which the applicator attaches to the container closure 404 with flip-top spout removed (FIG. 4), is a rectilinear protrusion 805 with a through-hole 701, half-round tip 806 and circular bosses 807 and 601 that are concentric to the half-round tip 806 and on the opposing sidewalls 702 and 703 of the protrusion 805. The protrusion tip 806 is configured to form a liquid-tight seal against the mating surface 512 of the container closure 504 and to firmly attach the housing 502 to the container closure 504 by pressing the tip of the protrusion 503 into the flip-top spout cavity 401, where the two circular bosses 807 and 601 of protrusion 805 snap-fit into the two slots 402 and 403 on each side of container closure 404 cavity 401. The container closure 404 has a threaded fit 513/514 with the open end of container 506

Figure 10:
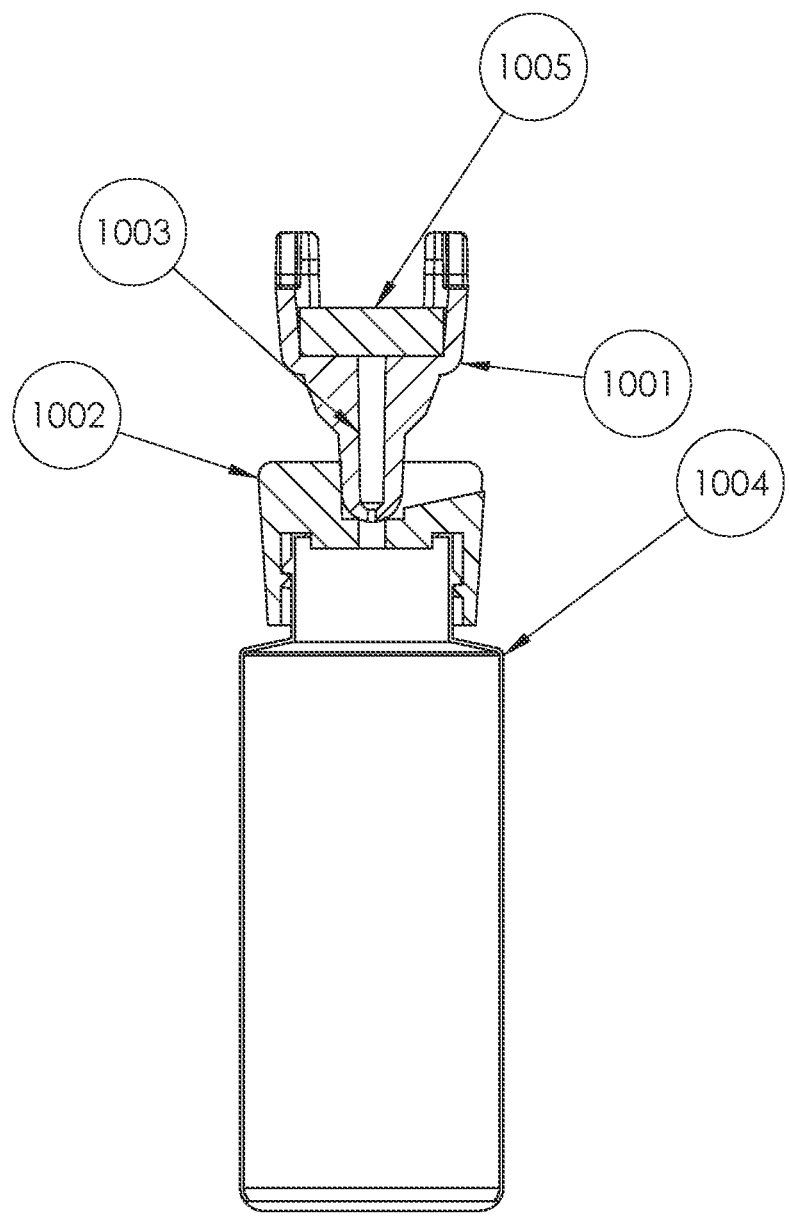
FIG. 10 shows an inverted cross-sectional side view taken along section 10-10 of FIG. 2, showing a drive chain lubricant applicator and dispensing container, with the applicator having a pivoting member and in an open position, in accordance with certain embodiments of the disclosure.
Figure 11:
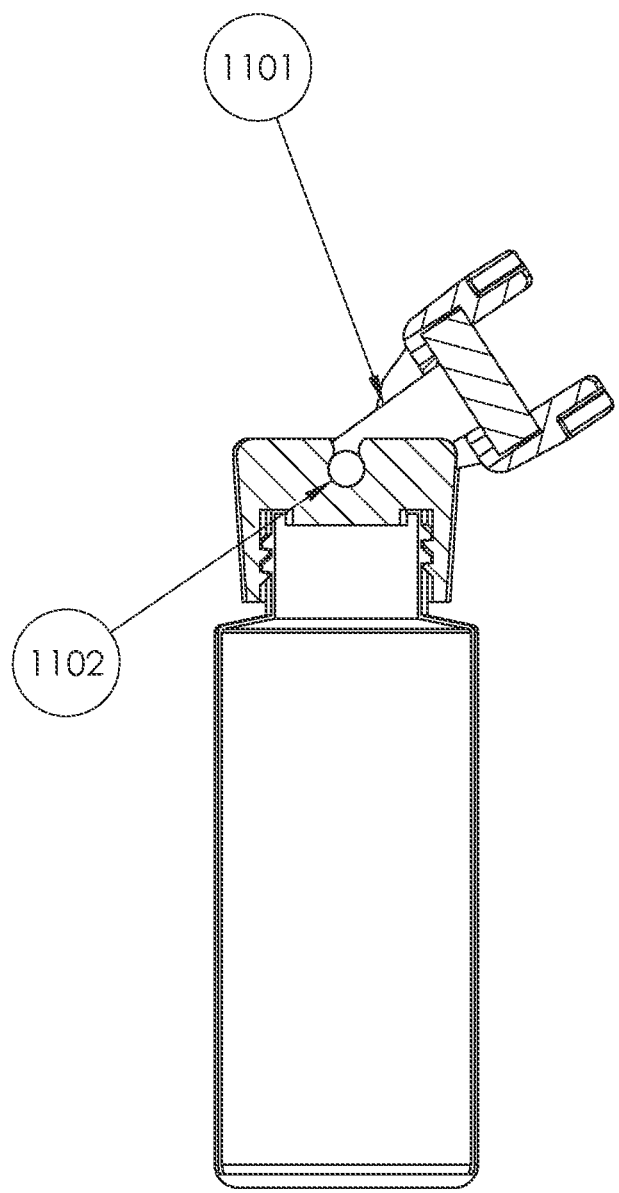
FIG. 11 shows an inverted cross-sectional view offset from section 10-10 of FIG. 2, showing a drive chain lubricant applicator and dispensing container, with the applicator having a pivoting member and in a closed position, in accordance with certain embodiments of the disclosure.
Figure 12:
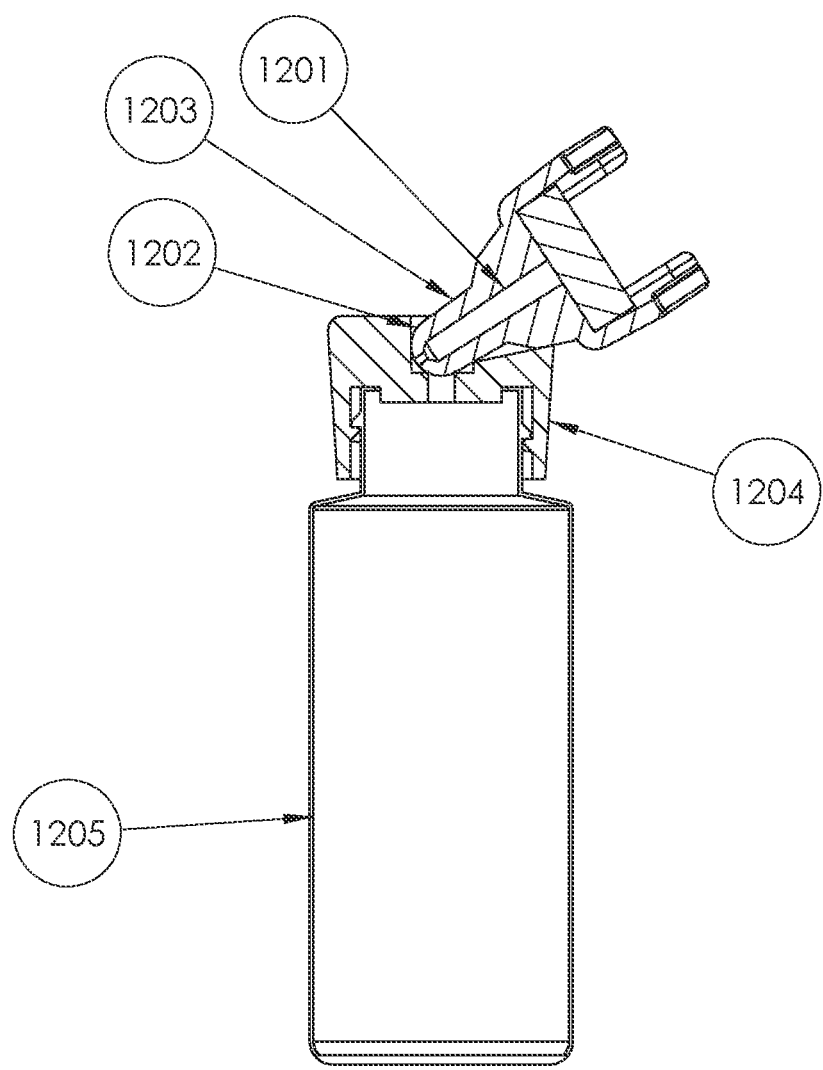
FIG. 12 shows the applicator of FIG. 10 having a pivoting member and in a closed position, in accordance with certain embodiments of the disclosure.

FIG. 10 through FIG. 12 show the FIG. 2 embodiment of the present disclosure, with the housing 1001 installed in the container closure 1002, in the open position (FIG. 10) to allow unrestricted flow of liquid through the fluid conduit 1003 from the container 1004 to the absorbent pad 1005, and (FIG. 11 and FIG. 12) with the applicator rotated about the axis of housing 1101 circular boss 1102, closing the fluid conduit 1201, so the half-round tip 1202 of the housing 1203 effectively seals against the container closure 1204 to prevent unwanted liquid discharge from the container 1205.

Referring to FIG. 10 and FIG. 2, with the housing 1001 and fluid conduit 1003 in the open position, and the applicator 201 in an inverted position (FIG. 2), a user holds the absorbent pad 206 against the top of the drive chain 204, and as the chain 204 is advanced along its lengthwise axis and through the housing 205, the user gently squeezes the container 202, dispersing a small amount of lubricant into the absorbent pad 206 and onto the drive chain 204. In the case of a bicycle, the chain 204 may be advanced by backpedaling, and as the entire length of the chain 204 is advanced through the housing 205 along the lengthwise axis of the chain 204, the chain is completely lubricated. It has been found that with the arrangements shown and described herein, the chain 204 can be properly and uniformly lubricated in all portions thereof, and there is no dripping or other unwanted contamination of the lubricant on other objects.

With regard to certain specific features of the applicator 201, it will be noted that the absorbent pad 206 is of a sufficient size, density and stiffness to hold a variable amount of lubricant without dripping; enable easy installation into and removal from housing 205; and stay in place within the housing 205 without becoming dislodged as the chain 204 is advanced through the housing 205. In the embodiments disclosed herein, the absorbent pad measures 1 inch, along the lengthwise axis of the chain 204, three-quarter inches wide, and one-quarter inch thick. However, other dimensions are suitable.

Also, as indicated previously, the absorbent pad 204 can be easily turned to the opposite side to maximize pad life, or conveniently and inexpensively replaced.

Figure 13:
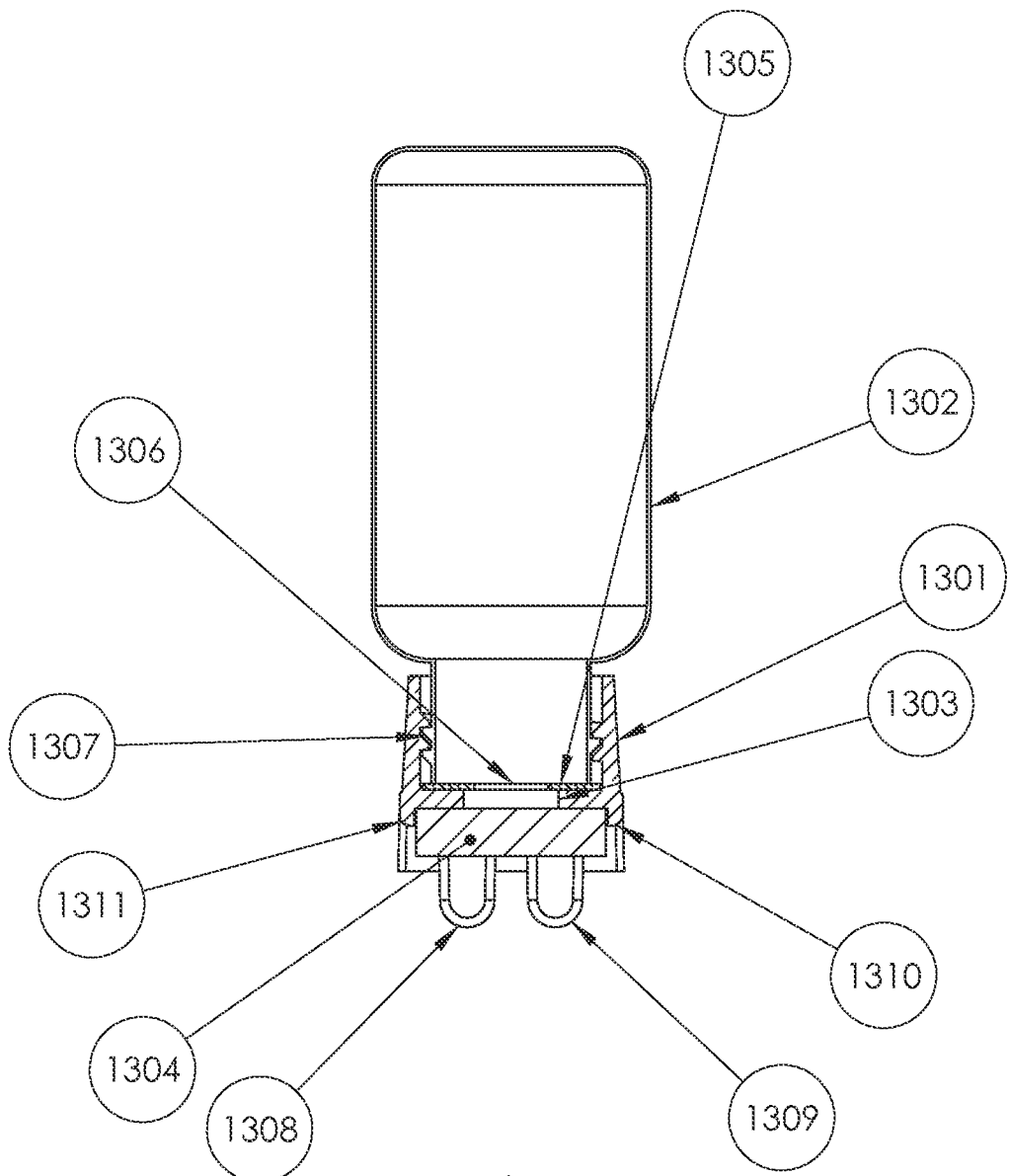
FIG. 13 shows a cross-sectional front view of the drive chain lubricant applicator shown in FIG. 1, showing a drive chain lubricant applicator and dispensing container in accordance with certain embodiments of the disclosure.

FIG. 13 shows the FIG. 1 embodiment of the present disclosure, which is similar to the FIG. 2 embodiment with the exceptions of having an integrated housing-and-container-closure 1301 and the means for shutting off the flow of liquid from the container 1302. The FIG. 1 embodiment combines the FIG. 2 housing 205 and container closure 203 as a single part 1301, having an opening 1303 between the absorbent pad 1304 and the container 1302. A flow-control diaphragm 1305, made, for example, from an elastomeric material and having a slit 1306 or other opening to regulate fluid discharge, and configured to seal the open end of container 1302 and the underside of the housing 1301 when fluid is not being discharge. The container closure 1301 has a threaded fit 1307 with the open-ended neck of container 1302. In certain embodiments, the control diaphragm 1305 may have one or more compressible openings configured to open when liquid pressure is applied from the container and configured to seal when the pressure is released. In certain embodiments, the housing 1301 may be retained against the open-ended neck of container 1302 by a press-fit, or other appropriate configuration that secures the applicator to the container neck and that prevents leakage of the fluid. In certain embodiments, O-rings, gaskets or other seals may be employed.

Figure 14:
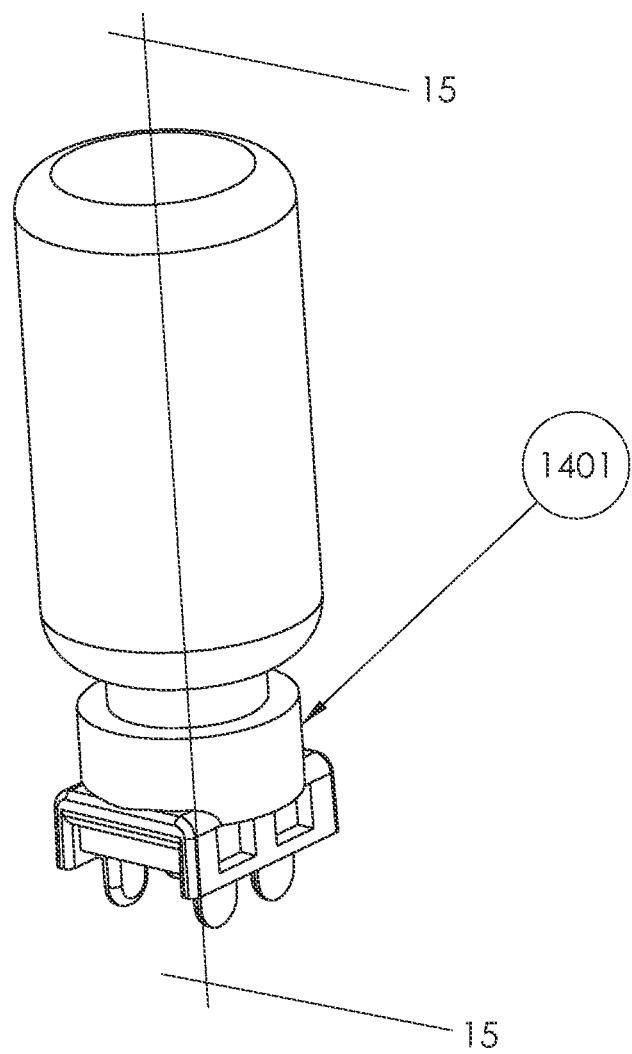
FIG. 14 shows a perspective view of a drive chain lubricant applicator and dispensing container, shown in accordance with certain embodiments of the disclosure.
Figure 15:
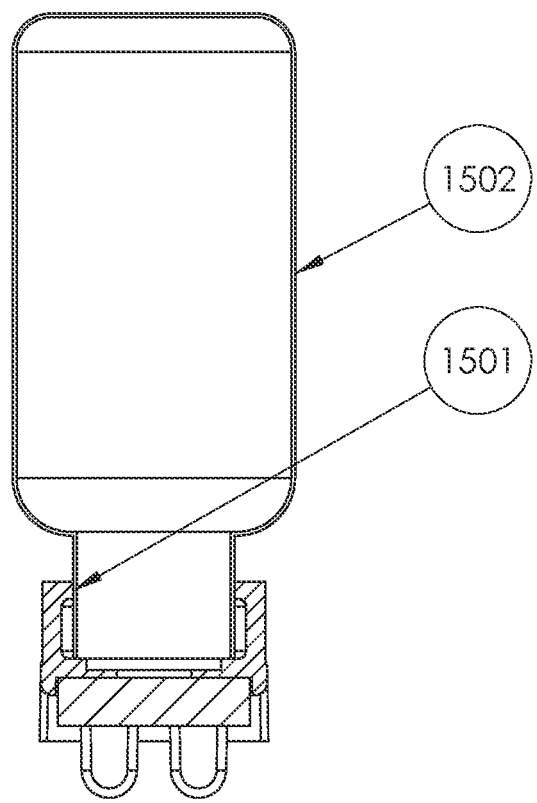
FIG. 15 shows a cross-sectional front view of the drive chain lubricant applicator shown in FIG. 14, showing a drive chain lubricant applicator and dispensing container in accordance with certain embodiments of the disclosure.

In another embodiment of the present disclosure, FIG. 14 and FIG. 15 reference the FIG. 1 embodiment, but combine the FIG. 13 housing 1301 and slitted control diaphragm 1305 as a single elastomeric part with a tubular neck 1401 having a compression fit 1501 with the open end of container 1502.

Figure 16:
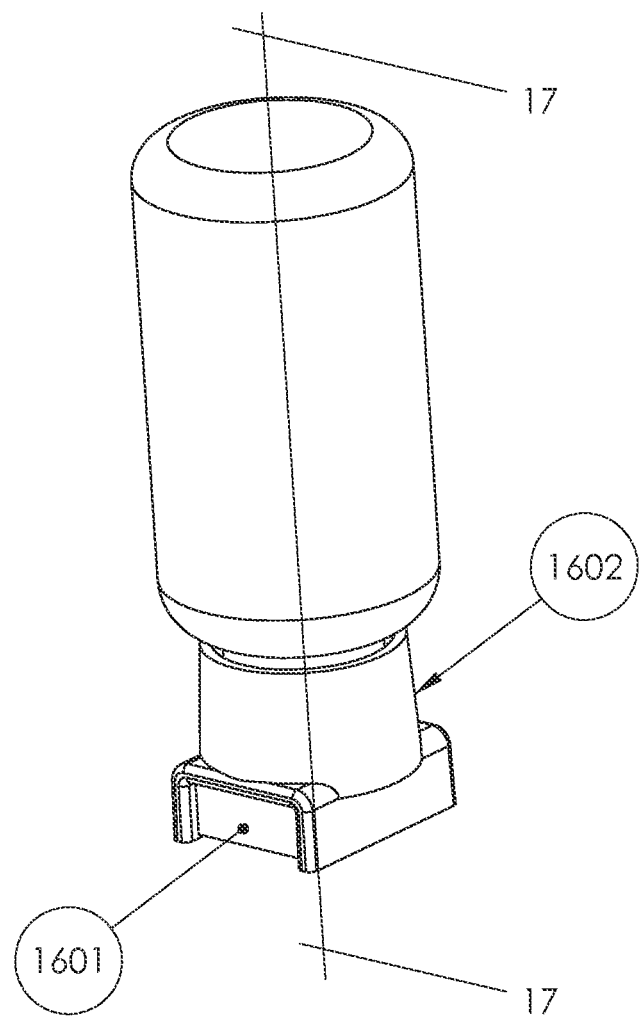
FIG. 16 shows a perspective view of a drive chain lubricant applicator and dispensing container, in accordance with certain embodiments of the disclosure.
Figure 17:
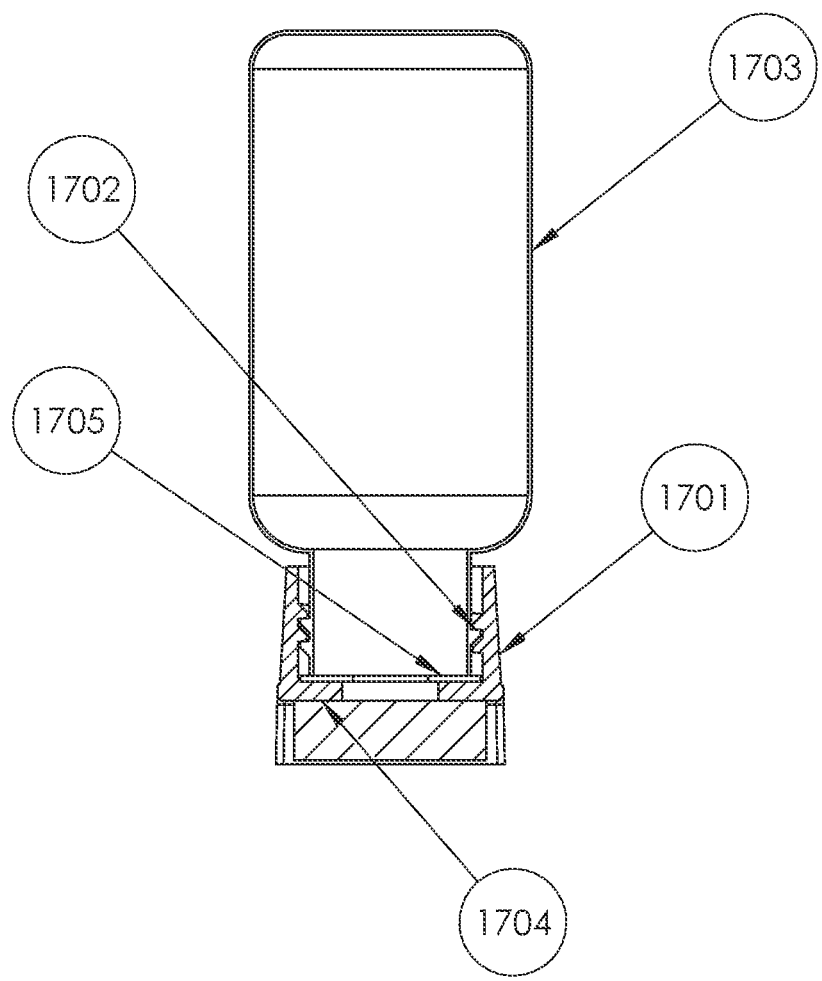
FIG. 17 shows a cross-sectional front view of the drive chain lubricant applicator shown in FIG. 16, showing a drive chain lubricant applicator and dispensing container in accordance with certain embodiments of the disclosure.

In an embodiment of the present disclosure, FIG. 16 and FIG. 17 reference the FIG. 13 and FIG. 14 embodiments, but without (FIG. 13) ribs 1308, 1309, (the opposite guide ribs not shown in this view), and 1310 and 1311. The container closure 1701 is shown with a threaded fit 1702 to the open-ended neck of container 1703, and an elastomeric diaphragm 1705 with a slit or other opening to regulate fluid discharge. FIG. 16 and FIG. 17 show absorbent pad 1601 permanently or semi-permanently attached to the housing 1602 with an adhesive backing 1704.

FIG. 18 shows a spray can embodiment of the disclosure, with a snap-fit assembly having two molded plastic parts, the absorbent-pad housing 1801 and spray-can attachment yoke 1802. Tongue-and-groove joints 1803 and 1804 on either side of parts 1801 and 1802 provide side-to-side fastening, and parts are fastened top-to-bottom by attachment yoke 1802 spring-finger 1805 that is captured between pad-housing 1801 ribs 1806 and 1814. Two opposing screws, 1807 and 1808, are configured to tighten against the flared-end of the spray can 1809 to mount and retain attachment yoke 1802. Other mechanisms may be used to attach yoke 1802 to spray can 1809 including a clamp or a slidable compression ring. Furthermore, in certain embodiments the yoke may be attached to the cylindrical body of spray can 1809.

A flexible tube 1810 serves as the conduit between the nozzle 1811 and the spout 1812 on absorbent pad housing 1801 that delivers spray-can contents to absorbent pad 1813.

Figure 19:
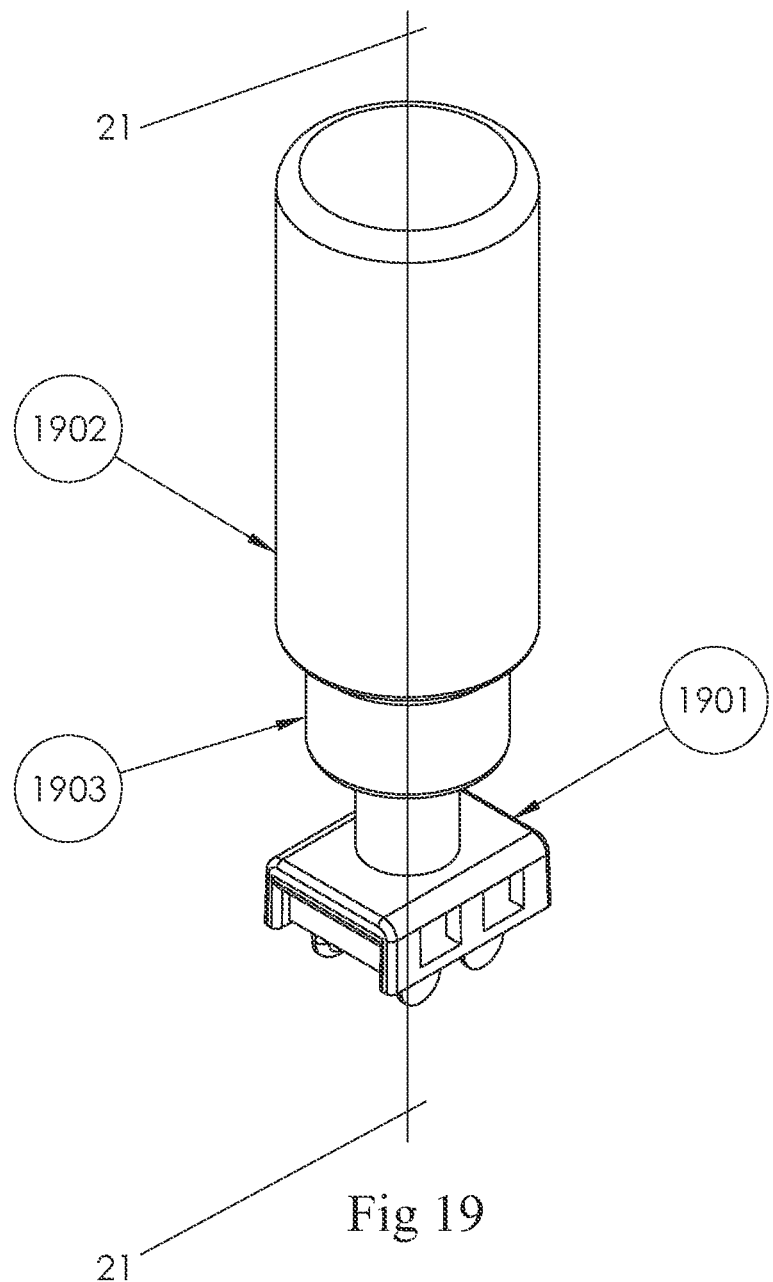
FIG. 19 shows a perspective view of a drive chain lubricant applicator and dispensing container, shown in accordance with certain embodiments of the disclosure.
Figure 20:
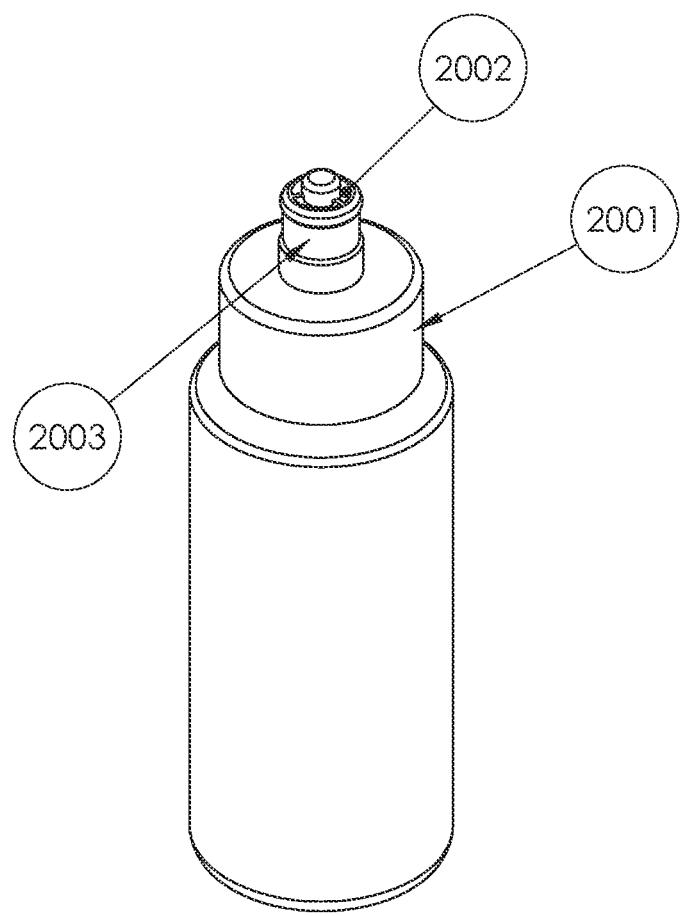
FIG. 20 shows a perspective view of a flexible, plastic dispensing container having a push/pull valve closure, shown without the valve cap, in accordance with certain embodiments of the disclosure.

In another embodiment as shown in FIG. 19, the applicator 1901 is used in conjunction with a standard plastic bottle 1902 and a standard push/pull valve dispenser closure 1903. This standard push/pull valve closure 2001 is shown in FIG. 20, without the valve cap, having an open end 2002 and a relieved neck 2003 for captivating a valve-cap.

Figure 21:
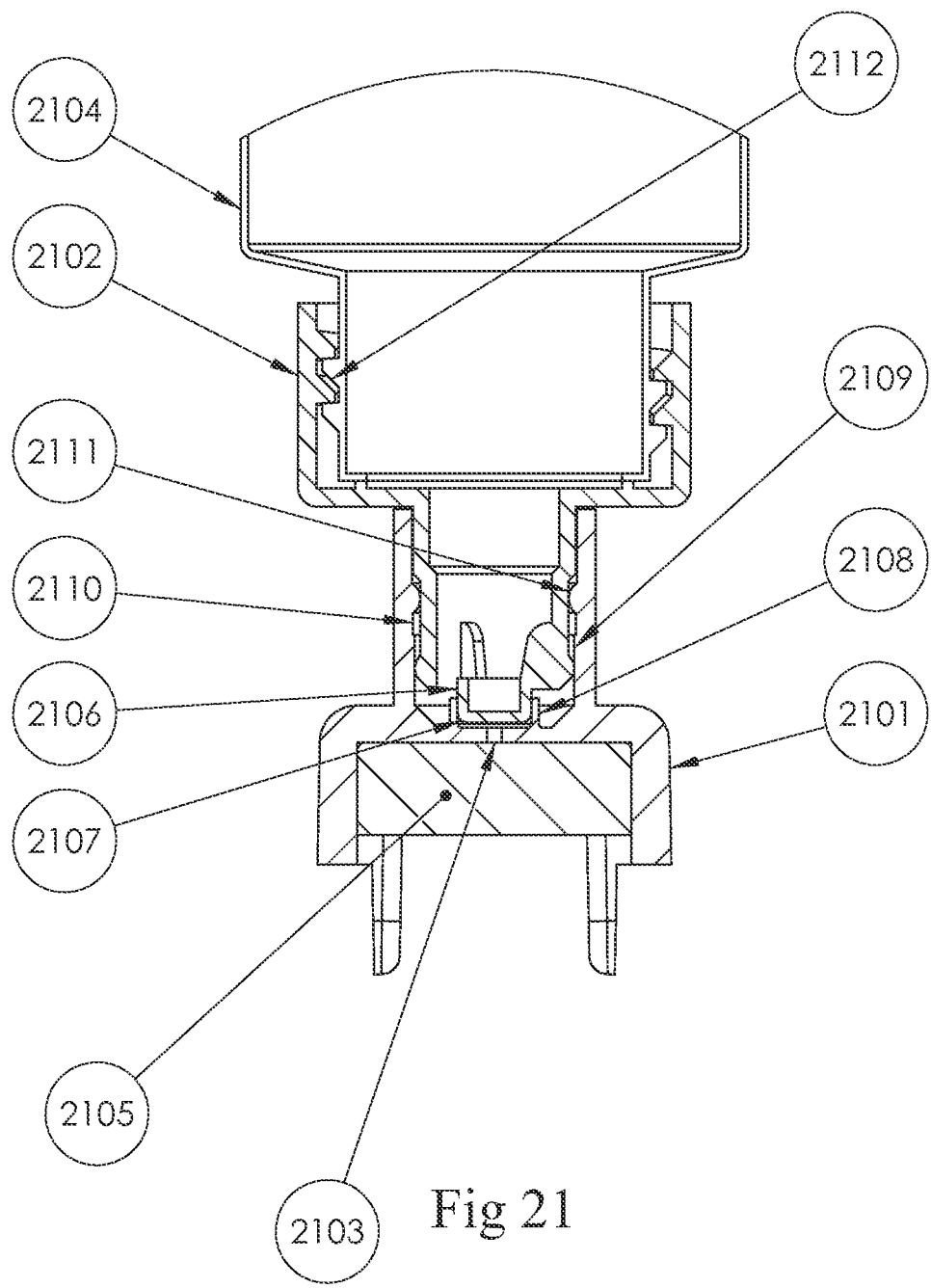
FIG. 21 shows a detail cross-sectional front view of the drive chain lubrication applicator of FIG. 19 showing a drive chain lubrication applicator and dispensing container in accordance with certain embodiments of the disclosure, showing the valve in a closed position.

FIG. 21 shows the FIG. 19 embodiment of the present disclosure, with the housing 2101 installed on the valve closure 2102, in the closed position to block liquid flow through the fluid conduit 2103 from the container 2104 to the absorbent pad 2105. The sidewall 2106 of cylindrical protrusion 2107 is at the open end of the valve closure 2102, and performs a wiping seal with the inside diameter of circular rib 2108 that protrudes from the end of bore 2109 on applicator housing 2101. The container closure 2102 is shown with a threaded fit 2112 to the open-ended neck of container 2104.

Figure 22:
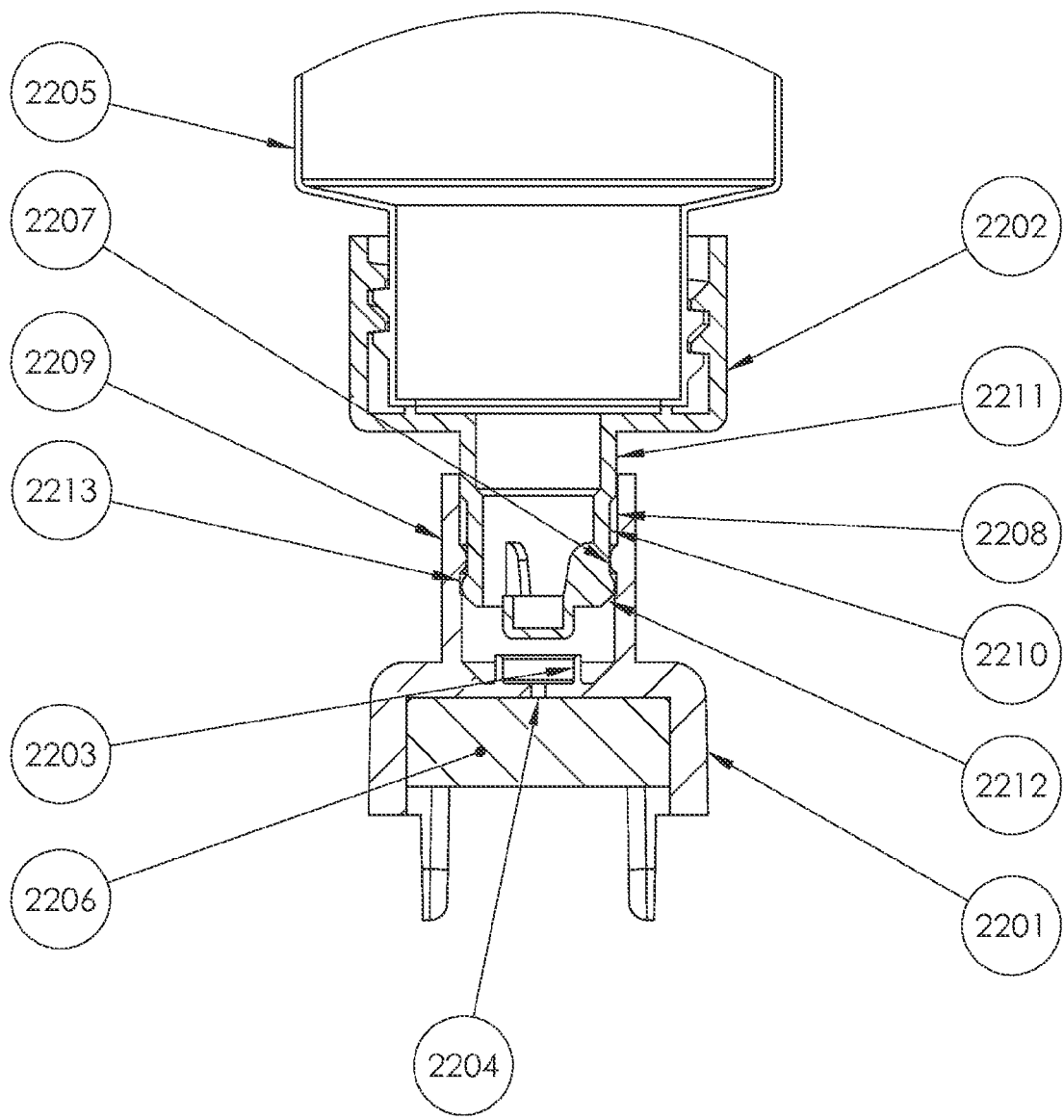
FIG. 22 shows a detail cross-sectional front view of the drive chain lubricant applicator of FIG. 19 showing a drive chain lubricant applicator and dispensing container in accordance with certain embodiments of the disclosure, showing the valve in an open position.

FIG. 22 shows the FIG. 19 embodiment of the present disclosure, with the housing 2201 installed on the valve closure 2202, in the extended and open position to allow liquid to pass by circular rib 2203 and flow through fluid conduit 2204 from the container 2205 to the absorbent pad 2206. Annular protrusion 2207 on inside diameter 2208 of cylindrical protrusion 2209 has an interference-fit with the "mushroomed" end 2212 of valve closure 2202, that fastens applicator with housing 2201 when the two parts are pressed together, and forms a liquid-tight seal with valve closure 2202 outside diameter 2210. Outside diameter 2211 and the "mushroomed" end 2212 of valve closure 2202 have a slip-fit with inside-diameter 2208 of housing 2201. Housing 2201 annular protrusion 2207 forms a liquid-tight seal with valve closure 2202 outside diameter 2210. "Mushroomed" end 2212 of valve closure 2202 holds housing 2201 in an open-valve position when engaged in housing 2201 relieved annular undercut 2213 below annular rib 2207, and when the applicator is held in compression while applying liquid to a drive chain.

The following is a method and sequence of assembling an applicator capable of lubricating a drive chain according to embodiments of the present disclosure. The methods comprise, for example, the steps of providing a container closure fabricated from a chemical-resistant material, capable of holding an absorbent pad, and having a liquid-tight seal with the container and a conduit between the pad and the container; providing a wear-resistant and liquid-absorbent pad of a size and density that will absorb a variable amount of liquid; providing a container having an open end that makes a liquid-tight seal with the fore-mentioned container closure; providing fastening means to secure the pad to the closure; and providing a means to shut off the flow of liquid from the container to the closure.

Lubricant applicators provided by the present disclosure may be fabricated using any appropriate material. For example, in certain embodiments a applicator may be fabricated using a material selected from a metal, an alloy, a plastic, a composite, and a combination of any of the foregoing. In certain embodiments, a applicator is fabricated from a thermoplastic. In certain embodiments, the thermoplastic is selected from polyethylene, polypropylene, nylon, polyvinyl carbonate, acrylonitrile styrene acrylate, and a combination of any of the foregoing. In general, it is desirable that the material from which a applicator is fabricated be solvent resistant and impact resistant.

The dimensions of the lubricant applicators provided by the present disclosure may be any suitable dimension. Suitable dimensions are determined, at least in part, by the dimensions of the drive chain to be lubricated, the dimensions of the fluid discharge spout or opening of a fluid container to be connected, the dimensions of the cap of the fluid container, and dimensions useful to provide sufficient mechanical integrity to the applicator under conditions of use. Certain features such as ribs, rounded corners, thickened or narrow dimensions, and the like may be employed as appropriate to accomplish these and/or other objectives.

Certain aspects of the lubricant applicator may be fabricated separately using the same or different materials and assembled, either prior to distribution, or by an end user. For example, a lubricant applicator may be provided as a part including a fluid opening, a housing having a recessed cavity and chain guides. Another part may comprise an assembly for enabling mechanical connection to a lubricant container. The separate parts may then include features that enable assembly such as snap-fit features or threads.

In certain embodiments, a lubricant applicator including the aspects that enable mechanical and fluid coupling to a lubricant container can be made from a single part, such as an injection molded part.

A fluid transfer pad may be made of any appropriate material that can transfer a liquid across a moving surface and also provide some resistance to fluid flow to prevent dripping. In certain embodiments, a fluid transfer pad is absorbent. In certain embodiments, a fluid transfer pad is selected from polyurethane, spun polypropylene, and a combination thereof. The shape and size of the fluid transfer pad may be any appropriate shape that functions to fit into the cavity of the applicator and that functions to transfer lubricant to the chain. The fluid transfer pad may be sized slightly larger than the cavity such that when inserted into the cavity, the fluid transfer pad is slightly compressed and retained within the cavity by compression. The surfaces of the fluid transfer pad may be flat, substantially flat, or may be shaped. For example, in certain embodiments a fluid transfer pad may have a corrugated or wavy surface on the side facing the chain to facilitate the transfer of lubricant into the central parts of the chain such as the pins, bushings, and rollers. In certain embodiments, a fluid transfer pad may have a central ridge or tongue that can reach into the inner parts of the chain to transfer lubricant to, for example, the rollers. In certain embodiments, an absorbent pad is sufficiently compressible that lubricant may be transferred to the inner parts of the chain. In certain embodiments, the surface of a fluid transfer pad may comprise protrusions, feathered features, or extensions configured to guide lubricant to surfaces of the chain. In certain embodiments, chain lubricant is transferred to the outer part of the chain to lubricate the pins and bushings, and not necessarily the rollers. (NOTE: Lubricating the outer part of the chain (pins and bushings) is where the lubricant is needed, not the rollers, and certainly not the side plates.)

Lubricant applicators of the present disclosure are intended to be used with any appropriate roller chain lubricant, and in certain embodiments, a motorcycle chain lubricant, and in certain embodiments, a bicycle chain lubricant. In general, lubricant applicators provided by the present disclosure may be used with low viscosity lubricants, For example, a useful viscosity range for a mountain bicycle can be from ISO VG10 to ISO VG32. In certain embodiments, a lubricant may have a viscosity less than ISO 25, less than ISO 50, less than ISO 75, less than ISO 100, and in certain embodiments, less than ISO 150. The porosity, absorbency, and/or other physical features of the fluid transfer pad may be selected to optimize transfer of lubricant from a dispenser to the chain depending on the viscosity of the lubricant being used.

In certain embodiments, a lubricant applicator for applying a fluid to a chain comprises a cavity for retaining a fluid transfer pad; and a container interface comprising an internal fluid conduit, wherein, the container interface is configured to mechanically couple to a fluid container; and the internal fluid conduit is configured to fluidly couple a fluid contained in the fluid container to the fluid transfer pad.

In certain embodiments, an applicator comprises a guide extending from sides of the cavity.

In certain embodiments of an applicator, the chain comprises a roller chain.

In certain embodiments, an applicator comprises a fluid transfer pad retained within the cavity.

In certain embodiments, the fluid transfer pad is absorbent.

In certain embodiments of an applicator, the fluid container comprises a flip-top spout dispenser.

In certain embodiments of an applicator, the container interface is configured to mechanically couple to a spout of a flip-top spout dispenser.

In certain embodiments of an applicator, the container interface is configured to replace a flip-top spout dispenser of a fluid container comprising a neck and a flip-top spout dispenser.

In certain embodiments of an applicator, the container interface is configured to mechanically couple to the neck.

In certain embodiments, an applicator comprises a cavity adjacent the fluid conduit configured to retain a diaphragm.

In certain embodiments, an applicator comprises a diaphragm adjacent the fluid conduit.

In certain embodiments, the diaphragm is porous.

In certain embodiments, the diaphragm comprises an elastomeric valve comprising at least one sealable opening.

In certain embodiments of an applicator, the container interface comprises threads configured to mechanically connect to a neck of the container.

In certain embodiments of an applicator, the container interface is configured to mechanically connect to a neck of the container with a compression fit.

In certain embodiments, an applicator comprises a chain guide wherein the chain guide overhangs the cavity to provide a lip configured to retain the fluid transfer pad.

In certain embodiments, an applicator comprises a chain guide, wherein the guide comprises at least one guide rib on either side of the applicator perpendicular to an axis parallel to the direction of travel of the drive chain.

In certain embodiments of an applicator, the container interface comprises a valve.

In certain embodiments, the applicator is configured to mechanically and fluidly connect to a spray-can type lubricant container.

In certain embodiments, an applicator comprises an attachment yoke configured to mount to a spray-can.

In certain embodiments, an applicator comprises a bracket mechanically connected to the applicator, wherein the bracket is configured to mechanically connect to a spray-type lubricant container.

In certain embodiments, an applicator comprises a tube having a first end fluidly connected to the internal fluid conduit and a second end for fluidly coupling to a discharge spout of a spray container.

In certain embodiments, an applicator is configured to mechanically and fluidly couple to a push/pull-type lubricant dispenser without a valve cap.

Fluid dispensers comprising an applicator provided by the present disclosure are also provided.

In certain embodiments, a dispenser comprises a fluid container mechanically coupled to the container interface and fluidly coupled to the fluid conduit.

In certain embodiments, a dispenser comprises a spray-type lubricant container mechanically coupled to the container interface and fluidly coupled to the fluid conduit.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A lubricant applicator for applying a fluid to a chain, comprising:
   a body defining a cavity, wherein the body comprise extensions only in a first direction comprising undercuts configured to retain a fluid transfer pad; and
   a container interface comprising a fluid conduit, wherein,
      the container interface is configured to securely mechanically couple to a fluid container; and
      the fluid conduit is configured to fluidly couple a fluid contained in the fluid container to a fluid transfer pad.

2. The applicator of claim 1, comprising a guide extending from both sides of the body in the lengthwise direction.

3. The applicator of claim 1, wherein the chain comprises a roller chain.

4. The applicator of claim 1, comprising a fluid transfer pad retained within the cavity.

5. The applicator of claim 4, wherein the fluid transfer pad is absorbent.

6. The applicator of claim 1, wherein the fluid container interface comprises a flip-top spout dispenser.

7. The applicator of claim 1, wherein the container interface is configured to securely mechanically couple to a spout of a flip-top spout dispenser.

8. The applicator of claim 1, wherein the container interface is configured to replace a flip-top spout dispenser of a fluid container comprising a neck and a flip-top spout dispenser.

9. The applicator of claim 8, wherein the container interface is configured to securely mechanically couple to the neck.

10. The applicator of claim 1, comprising a cavity adjacent the fluid conduit configured to retain a diaphragm.

11. The applicator of claim 1, comprising a diaphragm adjacent the fluid conduit.

12. The applicator of claim 11, wherein the diaphragm is porous.

13. The applicator of claim 11, wherein the diaphragm comprises an elastomeric valve comprising at least one sealable opening.

14. The applicator of claim 1, wherein the container interface comprises threads configured to securely mechanically connect to a neck of a fluid container.

15. The applicator of claim 1, wherein the container interface is configured to securely mechanically connect to a neck of the container with a compression fit.

16. The applicator of claim 1, comprising a chain guide.

17. The applicator of claim 1, comprising a chain guide, wherein the chain guide comprises at least one guide rib on either side of the cavity in the lengthwise direction.

18. The applicator of claim 1, wherein the container interface comprises a valve.

19. The applicator of claim 1, wherein the applicator is configured to securely mechanically and fluidly connect to a spray-can type lubricant container.

20. The applicator of claim 1, comprising an attachment yoke configured to mount to a spray-can.

21. The applicator of claim 1, comprising a bracket mechanically connected to the applicator, wherein the bracket is configured to mechanically connect to a spray-type lubricant container.

22. The applicator of claim 1, comprising a tube having a first end fluidly connected to the fluid conduit and a second end for fluidly coupling to a discharge spout of a spray container.

23. The applicator of claim 1, configured to securely mechanically and fluidly couple to a push/pull-type lubricant dispenser without a valve cap.

24. A fluid dispenser comprising the applicator of claim 1.

25. The dispenser of claim 24, comprising a fluid container securely mechanically coupled to the container interface, wherein fluid within the fluid container is fluidly coupled to the fluid conduit.

26. The dispenser of claim 25, wherein the fluid container is configured to dispense the fluid when the fluid container is squeezed.

27. The applicator of claim 24, comprising a spray-type lubricant container securely mechanically coupled to the container interface, wherein fluid within the spray-type lubricant container is fluidly coupled to the fluid conduit.

28. The applicator of claim 1, comprising a fluid container securely mechanically coupled to the container interface.

29. The applicator of claim 1, wherein the container interface comprises a flip-top spout dispenser.

30. The applicator of claim 1, wherein the container interface comprises a spout configured to securely mechanically couple to a flexible tube.

31. The applicator of claim 1, wherein the body comprises a rib on both sides of the cavity in a transverse direction and configured to retain the fluid transfer pad.

32. The applicator of claim 31, wherein each rib is characterized by a height that is less than a thickness of the fluid transfer pad.

33. The applicator of claim 1, comprising a chain guide, wherein the chain guide comprises at least one guide rib on either side of the cavity, wherein each guide rib extends beyond a thickness of the fluid transfer pad.

* * * * *